United States Patent [19]

Follmer

[11] 3,896,975

[45] July 29, 1975

[54] NON FOAMING LECITHIN EMULSION COOKWARE LUBRICANT

[76] Inventor: Dan W. Follmer, 5230 Coruna Ct., Santa Barbara, Calif. 93111

[22] Filed: July 26, 1974

[21] Appl. No.: 492,258

Related U.S. Application Data

[63] Continuation-in-part of Ser. No. 267,070, June 28, 1972, abandoned.

[52] U.S. Cl. ............... 222/192; 106/244; 106/287 R
[51] Int. Cl.² ... C08L 91/00; C09K 3/30; B65D 83/14
[58] Field of Search ............... 106/244, 243, 287 R; 117/167; 222/192

[56] References Cited

UNITED STATES PATENTS

| | | | |
|---|---|---|---|
| 2,796,363 | 6/1957 | Lalone | 117/167 |
| 3,038,816 | 6/1962 | Drell et al. | 106/243 |
| 3,318,704 | 5/1967 | Eichberg | 106/243 |
| 3,366,494 | 1/1968 | Bower et al. | 99/189 |
| 3,661,605 | 5/1972 | Robin et al. | 106/244 |
| 3,821,007 | 6/1974 | Carey | 117/167 |

*Primary Examiner*—Allan Lieberman
*Attorney, Agent, or Firm*—Louis J. Bachand

[57] ABSTRACT

Lecithin aqueous emulsion applicable to hot or cold pan surfaces without foaming for more complete surface coverage and ready consumer acceptance is provided adapted to be pressurized under a propellant vapor phase, for dispensing as an aerosol.

22 Claims, No Drawings

NON FOAMING LECITHIN EMULSION COOKWARE LUBRICANT

REFERENCE TO RELATED APPLICATION

This application is a continuation-in-part of and hereby incorporates by reference my copending application Ser. No. 267,070, filed June 28, 1972, now abandoned.

BACKGROUND OF THE INVENTION

This invention has to do with surface lubrication of frying pans and like cooking implements. More particularly the invention is concerned with an water-in-oil emulsion for the application of lecithin and like lubricant materials to frying pan and other surfaces needing lubrication against food sticking or difficult clean-up and without foaming, for more complete coverage of such surfaces.

In cooking, the housewife is often confronted with the need to lubricate the cooking surface to prevent food from sticking and to facilitate clean-up. In the past, use has been made of butter and greases for this purpose. Low fat and low calorie diet regimens preclude such expedients. More recently, oleomargarine and the like have been used. Then technology came to the aid of the housewife in the form of resin coated cooking surfaces such as Teflon (registered trademark) resin coated cookware, but this too eventually required supplementary lubrication. Many other cooking artifacts are also desirably lubricated e.g. barbecue grills, ladles and ovens to mention a few. All these surfaces are considered "cookware surfaces" herein.

Each of the foregoing expedients for preventing the sticking of food or for facilitating clean-up of cookware has disadvantages either from a health or taste standpoint or from a cost standpoint as in the case of Teflon cookware.

It has been proposed to use a naturally occurring product, namely lecithin as a lubricant for cookware surfaces. Indeed lecithin is uniquely effective, if not chemically adulterated as by hydroxylation to lose lubricity, because in addition to its lubrication qualities it is a naturally occurring material, found in the human cells and is apparently an integral part of body functioning. It provides lubrication without cholesterol. Early workers sought to dissolve lecithin in oil, i.e. propellant. For example, in U.S. Pat. No. 2,796,363 it is disclosed to use lecithin and like fatty acid esters dissolved in propellant as lubricants on cooking implements. Also in U.S. Pat. No. 3,038,816 an improvement on the earlier patent is apparently disclosed, involving the use of particular propellants as a solvent vehicle in onephase compositions prepared by an exacting method.

The diseconomics of such systems involving the use of great quantities of propellant for a little lubrication, the potential for abuse found in readily concentratable vapors of halogenated hydrocarbon and the possibility of dangerous by-product generation in use has prompted others to seek water based systems. Since lecithin is hydrophobic a dispersion formulation was sought. In the only published effort, U.S. Pat. No. 3,661,605 to Rubin et al, the use of hydroxylated, adulterated lecithin was resorted to to obtain adequate mixing with water. While a water mix was achieved, the price was too high, the hydroxylated lecithin does not function effectively as lecithin per se on lubricating surfaces.

Accordingly, it is an object of the present invention to provide a low cost, but lubricating-effective, composition for delivery onto cookware surfaces without formation of hazardous gases and at lower cost.

Another object is to provide a lecithin delivery system in which flavor or appearance modifiers and supplements can be conveniently incorporated. A further object is to provide a water in oil (water in lecithin) system in which the components are truly emulsified and stable, do not foam when applied and assume in large measure the appearance of anhydrous lecithin aerosol products already known and accepted by the consumer. Other objects will appear hereinafter.

SUMMARY OF THE INVENTION

The foregoing objects are realized in accordance with the present invention by forming an water-in-oil emulsion of lecithin having a critically low HLB number i.e. not greater than 4 or 7 in some instances and packaging the emulsion with propellant for aerosol delivery onto cookware surfaces.

Several advantages flow from this innovation. Initially, the high cost of propellants becomes less of a factor, since far less propellant may be used. The propellant is not required as a vehicle for the lecithin to be sprayed as in the anhydrous patents above mentioned. Also, the emulsion forms a pleasing briefly visible foam-free layer on the frying pan or other surface where it is readily determinable as to location, extent and adequacy of coverage, and uniformity in depth of accumulation. Generally white, this layer can be yellow to simulate butter, red to simulate wine or otherwise colored. Moreover, the both aqueous and oil system will accept high levels of butter flavors, salt and other seasonings, flavor and aroma enhancers and modifiers. In addition, the water content of the system, when contacting the hot pan surfaces evaporates, effecting a cooling at these surfaces. This cooling evens heat across the pan and, as well, reduces the chances of scorching the pan, as the lecithin is applied. The lecithin is thus not decomposed, which decomposition can give rise to foreign odors and tastes in bland, delicate foods, such as crepes and fish. There is no hazard of toxic fumes, either, since hydrocarbon or even inorganic propellant can be used, and little propellant, if any is actually taken to the heated burner surfaces. Accordingly, the invention provides a product which is better looking, better tasting, lower in cost, more facile in application, more versatile in performance, safer in use, and a significant improvement in the state of the art.

In particular the invention provides a cookware lubricant system adapted to be dispersed under aerosol propellant pressure from a suitable container onto a cookware surface without foaming while temporarily marking the surface coverage, such composition having a pH between 3.0 and 9.8 and comprising a water in oil emulsion of 0.5 to 25 percent by weight of lecithin consisting essentially of P-inositol, P-choline and P-cephalin phosphatides in a ratio providing an HLB number of not more than 7.

Remarkably, by observing the various percentages of lecithin, commercial lecithin, components, the HLB number may be kept low to 4 or less, and the result of this critical tailoring of component concentrations in commercial lecithin is a true water in oil emulsion and one which does not foam although delivered from an aerosol package. Specifically in the cookware composition of the invention, P-inositol, the least water soluble of the lecithin components, comprises not less than 10% of the total weight of phosphatides. The cookware composition which may contain 2 to 10 percent by weight lecithin, typically will contain P-cephalin in an amount less than 50 percent of the total weight of phosphatides, and P-cephalin and P-choline together in an amount less than 85 percent of the total weight of phosphatides and preferably less than 45 percent thereof, while optionally containing fatty acid esters and vegetable oil diluent in minor amounts and of a type to maintain the HLB number at not more than 4 or at the most 7.

The low HLB number approach to lecithin systems is a departure from the single phase lecithin in propellant system of the earlier patents mentioned above surely and as well from the analogous approach of the Rubin U.S. Pat. No. 3,661,605 patent noted above, because the present invention seeks to minimize compatability with water, whereas Rubin seeks to use lecithin modified to be water compatible i.e. to seek as closely as possible the single phase system of the earlier patents albeit in an aqueous environment. In contrast to the Rubin approach of maximizing hydrophilicity, the present invention maximizes hydrophobicity to achieve its purposes and thereby avoid foaming while retaining the benefit of using natural, and not adulterated lecithin.

The invention thus comtemplates a cookware lubricant composition adapted to be dispensed under aerosol propellant pressure from a suitable container onto a cookware surface without foaming while temporarily marking the surface coverage, such composition comprising an aqueous emulsion of an oil type lubricant having an HLB number not greater than 7 and consisting essentially of commercial lecithin containing by weight not less than 10 percent P-inositol based on the combined weight of phosphatides therein, and as noted above, typically not more than 50 percent by weight P-cephalin or 85 percent by weight of P-cephalin and P-choline taken together, relative to the total amount of phosphatides present. The emulsion typically will contain not less than 45 percent and preferably 50 percent and more up to 75 percent and higher of water and may contain fatty acid esters as emulsifiers provided that the same when taken with the lecithin are such that the resulting HLB number is not greater than 7. Vegetable oil and hydrocarbon diluents may also be used, e.g. soybean oil, aliphatic solvent such as hexane and liquified propellant e.g. isobutane, in the composition.

In certain embodiments ionic salts of polyvalent cations, particularly alkaline earth metal cations, may be used in quite small amounts, e.g. up to about 1 percent by weight of the composition. Also organic acids, such as ascorbic acid may be added to the composition in amounts up to about 0.5 percent and desirably in combination with up to about 1 percent of the corresponding alkaline earth metal salt e.g. calcium ascorbate. Preferred compositions have a pH of 6.5±1.0 i.e. between 5.5 and 7.5, with compositions having a pH as low as 3 being useful, while pH values above 9.8 and particularly higher e.g. 10.4 are to be avoided as being destructive of the emulsion stability.

The propellants useful in the aerosol packaging of the foregoing composition are those well-known normally gaseous materials which are liquefiable at pressures below about 90 psig and which may be selected from among, for example, hydrocarbons containing from 3 to 5 carbon atoms inclusive, such as propane, butane, isobutane and pentanes, chlorine and/or fluorine substituted hydrocarbons containing from 1 to 6 carbon atoms inclusive such as among others, tetrafluoromethane, fluoroform, monochlorotrifluoromethane, trichloromonofluromethane, monochlorodifluoromethane, dichlorotetrafluoroethane, pentafluoromonochloroethane, dichlordifluoromethane, octafluorocyclobutane, hexafluoroethane, monofluorodichloromethane, monofluorotrichloromethane, trifluorotrichloroethane, difluorotetrachloroethane, difluoroethane, and trifluoroethane and the like, as well as inorganic propellant such as nitrogen, nitrous oxide and carbon dioxide, these latter being peculiarly useful with the presently described water system, and mixture of various of the foregoing.

The invention further contemplates method for preparing the above compositions which includes gently swirling ambient or room temperature (65°- 95° F) lecithin adding water which has previously been warmed to between 130° F and 175° F filling the composition into a can and propellant pressurizing the hot composition. Additionally, where the water concentration in the composition is to be over 50 percent the water, preheated to a temperature between 155° to 175° F and preferably to about 165° F is slowly added to a slowly turning mass of ambient or room lecithin, with filling into a can and pressurizing while hot being then accomplished.

The present system does not rely on solubility characteristics of the propellant, unlike the system disclosed in U.S. Pat. No. 3,038,816 or the hydrophilicity of the lecithin unlike U.S. Pat. No. 3,661,685 each mentioned above. Accordingly, unsubstituted hydrocarbon propellants, such as propane and isobutane may be used, alone or in combination with the halogenated propellants, or propellants other than organic propellants may be used, such as carbon dioxide, nitrous oxide and nitrogen. These first mentioned propellants are nonflammable when sprayed with the water emulsion and thus safe in use.

DESCRIPTIONS OF THE PREFERRED EMBODIMENTS

The term "HLB number" as used herein refers to the Hydrophile-Lipophile Balance number which is an index to emulsifiers developed by Atlas Chemical Industries Inc. In their booklet "The Atlas HLB System" (copyright 1963) it is explained that the HLB number for a nonionic emulsifier is an indication of the percentage weight of the hydrophilic portion of the nonionic emulsifier molecule, divided by 5 for convenience in handling numbers. The HLB values for most nonionic emulsifiers can be calculated from either theoretical composition or analytical data, the theoretical computation is limited by the accuracy of the name of the emulsifier; the analytical method is surer and involves a calculation e.g. as follows:

$$HLB = 20 \left(1 - \frac{S}{A}\right)$$

wherein
S = the saponification number of the ester
A = the acid number of the recovered acid.

The HLB number of a given blend of emulsifiers is derived by multiplying the per cent concentration of the emulsifier in the blend by the HLB number for that emulsifier and adding the HLB products for the several emulsifiers which in sum are the HLB of the system.

As noted, the present invention is concerned with improvements in the packaging and delivery of lecithin and optionally other fatty esters to cookware surfaces where the lecithin is to function as a lubricant for foods to be cooked, e.g. onto surfaces of pans, cutlery, grills, griddles, oven walls and utensils. One of the problems with prior known developments in this art has been the inability to judge the completeness of coverage with the lecithin of the cookware surface, the lecithin being a clear, colorless liquid as generally applied. The failure to completely cover the cooking surface may result in spot sticking of food with possibly disastrous results, in the removal of a fried egg for serving for example or in aggravating clean-up problems. The invention obviates this particular problem because the lecithin-water emulsion product herein as delivered is opaque and readily viewed. Nonetheless, the opacity disappears almost immediately upon heating of the pan as the water evaporates and the lecithin returns to its non-visible form. This water evaporation takes place as the pan is heated or as the emulsion is applied to a preheated pan. Another problem encountered with prior art developments has been scorching of the pan as the lecithin is applied, owing to the unduly rapid heating of the lecithin. Burned lecithin is odorsome. The invention obviates this problem also, by water evaporation to give local cooling in and about the lecithin applied. In addition to these benefits to the consumer, the present product offers the advantage of considerably reduced cost to the producer and marketer and thus lower prices are available to the purchasing public. The reason for the saving is found in the substantial use of water rather than expensive organic propellants. It will be noted in U.S. Pat. No. 3,038,816 for example that to a batch containing only 6.25 pounds of anhydrous lecithin there was added 293.75 pounds of Freon 11 and 200 pounds of Freon 12. This solution was then packaged in aerosol dispensers. Only 6.25 pounds out of 500 pounds in the batch is lecithin (1.25%), the balance is expensive propellant (98.75%). From a consideration of the examples below, it will be observed that the quantity of propellant required herein, be it a Freon or other type propellant has been greatly reduced.

Lecithin is obtainable from soya beans and egg yolk. It is a liquid, viscous or even solid misture of the diglycerides of stearic, palmitic and oleic acids, linked to the choline ester of phosphoric acid. It contains about 4% phosphorous by weight and has the formula $C_{43}H_{88}NO_9P$. Variously pure grades of the product are sold commercially as lecithin and the term "lecithin" herein is intended to refer to commercial lecithin.

Natural soybean lecithin contains three basic phosphatides:

1. P-inositol possibly having this structure

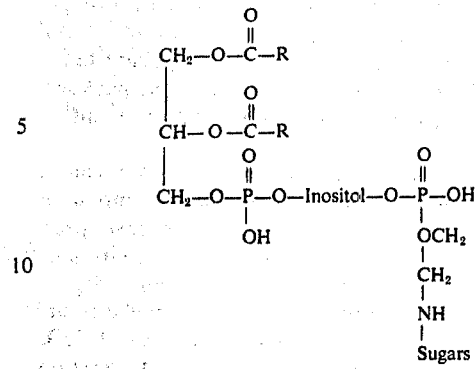

in which R is a hydrocarbon radical.

2. P-choline (chemical lecithin) having the structure

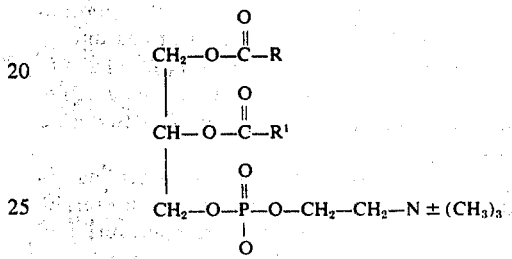

in which R and $R^1$ are each hydrocarbon radicals and

3. P-cephalin

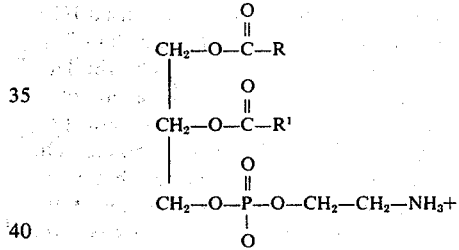

in which R, and $R^1$ are as indicated for P-choline.

Of the various lecithins available only those having the requisite minimum of P-inositol are useful and of these those exceeding 50 percent by weight P-cephalin or 85 percent P-cephalin and P-choline based on total phosphatides are not useful. It is preferred to have a minimum of 30 percent by weight P-inositol up to 60 percent by weight of the total phosphatides in the lecithin and conversely not more than 70 percent and preferably not more than 40 percent of P-choline and P-cephalin combined. As noted in U.S. Pat. No. 2,796,363 mentioned above, certain other compounds have been considered equivalents of lecithin as pan lubricants namely the so-called edible detergents such as glyceryl monstearate, glyceryl monooleate and fatty acid esters such as diethylene glycol stearate, sorbitan monostearate sorbitan tristearate, propylene glycol monolaurate and polyethylene glycol fatty acid esters such as polyethylene glycol monostearate and polyethylene glycol monoolaurate. It may be desirable to employ one or more of the foregoing alternatives to lecithin with the lecithin or functionally equivalent ester to act as an added emulsifier, particularly when a relatively viscous lecithin is used. In general, at least 10% of the fatty acid ester content in the system will be lecithin or equivalent. In certain embodiments, up to 15 parts and preferably between 1 and 5 parts by a weight of added emulsifier per 100 parts by weight of the lecithin (or equivalent ester), water and propellant taken together, in the system, may be present in the package, all selected in view of the HLB number requirement set out herein.

The propellant used is conventional, e.g. a normally gaseous compound or mixture of such compounds which can be liquefied at usable aerosol dispenser pressures, i.e. between 15 and 125 pounds per square inch gage pressure and preferably between 35 and 65 psig, up to 90 psig. Accordingly, suitable propellants are non-toxic chemically inert materials gaseous at 25°C and 760 mm. Hg. pressure and liquefiable at pressures equal to or less than about 90 to 125 psig. Such materials have been listed hereinabove. Mixtures of these propellants may be used. Preferably, the propellant contains at least a major weight proportion of a perhalogenated alkane of from 1 to 2 carbon atoms and no more than 30 weight percent of a second propellant selected from the above mentioned gaseous alkanes and chloro and fluoro-substituted nonperhalogenated gaseous alkanes.

To prepare the present products, the water may be preheated to e.g. between 155° F and 175° F preferably 165° F, added slowly to the ambient temperature lecithin being slowly turned in a blending apparatus and the propellant then added to the hot mixture in a can on a suitable pressure packaging apparatus. The lecithin may be thinned with vegetable oils, liquid aliphatic solvents such as the Isopar solvents particularly hexane, modified with emulsifiers selected to maintain an HLB number of preferably 4 or less and not more than 7, to facilitate forming the emulsion. Alternatively, the lecithin, suitably thinned, if necessary, may be added at ambient temperature to the water component preheated to between 130° F and 175° F with mixing. The water in oil relationship of the water and lecithin in the system is critical to the avoidance of foaming of the mixture as applied, and thus to adequacy of coverage and consumer acceptance.

The invention will be further described and illustrated by the following Examples, wherein all percentages are by weight.

EXAMPLE 1

A water in oil dispersion was prepared by first mixing together lecithin containing above 10 percent P-inositol, soybean oil, diluent comprising $C_6$–$C_9$ (Isopar) and vegetable oil (glycerol oleates) in the ranges indicated below to have an HLB number of 4, and adding preheated water at 165° F thereto slowly while continuing slow turning of the lecithin mixture; the mixture was piped into 13 oz. aerosol containers while hot, followed by crimping on of dispensing valve top and adding the indicated propellant to dispensing pressure. Upon testing, the container dispenses a nonfoaming semiopaque film onto a cookware surface which becomes colorless upon heating of the surface to proper cooking temperature, the coating thus acting as a thermometer to aid in cooking. Cooking of eggs in the cookware reveals a well-lubricated surface from which the eggs are easily removed; and clean-up without scouring is obtained.

Control I

Example 1 is duplicated substituting a lecithin containing approximately 4 percent P-inositol and 60 percent P-choline. A water in oil emulsion is formed but upon dispensing from the container, the emulsion inverts to an oil in water emulsion and foaming nearly in the nature of shave cream is experienced. Coating of pans is spotty unless great care is taken. In this connection it may be observed that where foaming is desired, in the dispensed product, slight changes in the foregoing formulation will effect such results.

Control II

Example 1 is duplicated but substituting polyoxyethylene sorbitol monolaurate, a high HLB emulsifier, for the glycerol oleate. The net HLB is so high that a water in oil emulsion is not achieved. Foaming takes place upon dispensing.

EXAMPLE 2

Example 1 is duplicated substituting another edible vegetable oil in place of soybean oil. Results are equivalent.

EXAMPLE 3

Example 1 is duplicated with the addition of 1 percent by weight polyvalent ion salt i.e. calcium ascorbate as an emulsion stabilizer. Vitamin C, ascorbic acid may be added to this formulation in small amounts e.g. up to about 0.5 percent by weight. Other polyvalent ion salts which may be used include calcium, aluminum and magnesium salts of organic acids e.g. of benzoic acid, citric acid, propionic acid, ascorbic acid and the like, as well as their inorganic salts e.g. of nitric acid. Monovalent ions e.g. of sodium and potassium are to be avoided in all but trace amounts, i.e. less than 0.05 percent by weight in the composition.

EXAMPLE 4

A composition having the following formulation:

| | Weight % |
|---|---|
| A) Lecithin phosphatides comprising at least 10% by weight P-inositol | 4 |
| B) Soybean Oil | 3 |
| C) Aliphatic Solvent | 7 |
| D) Glyceryl palmitate | 1 | was added at ambient temperature to preheated water at 135° – 175° F and propellant added to complete the formulation i.e.

| | |
|---|---|
| E) Water | 50 |
| F) Isobutane | 9 |
| G) Difluorodichloromethane | 26 |

An effective cookware surface spray was obtained.

As noted above edible vegetable oils, i.e. glyceryl esters of fatty acids such as lauric, linoleic, oleic, and linolenic acids can be used in the formulation, for their flavor and appearance and as diluents for the lecithin where this is desired. In addition to the safflower oil, and soybean oil mentioned above, there may also be used peanut oil, olive oil, cocoa butter, corn oil, coconut oil, cottonseed oil, others e.g. palm nut oil and aprocot kernel oil, among others. These edible vegetable oils may be employed in amounts from 1 to 10 parts per part of lecithin or more or less as desired.

I claim:
1. Cookware lubricant composition adapted to be dispensed under aerosol propellant pressure from a suitable container onto a cookware surface without foaming while temporarily marking the surface coverage, said composition comprising an aqueous component having a pH between 3 and 9.8 and comprising a water in oil emulsion of 0.5 to 25% by weight of lecithin consisting essentially of P-inositol, P-choline and P-cephalin phosphatides in a ratio such that said composition has an HLB number of not more than 7, said P-inositol comprising not less than 10% of the total weight of said phosphatides.

2. Cookware composition according to claim 1 in which lecithin is present in an amount between 2 and 10 percent by weight, said P-cephalin is present in an amount less than 50 percent of the total weight of said phosphatides and said composition including also a fatty acid ester and vegetable oil diluent, of a type and in an amount to maintain the HLB number at not more than 7.

3. Cookware composition according to claim 2 in which said P-cephalin and P-choline taken together are present in an amount less than 85% of the total weight of said phosphatides and the balance of said phosphatide is P-inositol.

4. Cookware lubricant composition adapted to be dispensed under aerosol propellant pressure from a suitable container onto a cookware surface without foaming while temporarily signal marking the surface coverage, said composition comprising a water in oil emulsion in water having a pH between 3 and 9.8, of 0.5 to 25 percent by weight of an oil type lubricant having an HLB number not greater than 7 and consisting essentially of commercial lecithin containing by weight not less than 10 percent P-inositol based on the combined weight of P-inositol, P-choline and P-cephalin phosphatides therein.

5. Composition according to claim 4 in which the P-choline and P-cephalin taken together are less than 85% by weight of the combined phosphatides.

6. Composition according to claim 5 in which the P-cephalin is less than 50 percent by weight of the combined phosphatides.

7. Composition according to claim 4 in which water comprises not less than 45% by weight of the emulsion.

8. Composition according to claim 4 including also a fatty acid ester emulsifier which taken with the lecithin provides an HLB number not greater than 7.

9. Composition according to claim 4 including also a vegetable oil diluent.

10. Composition according to claim 9 in which said diluent is soybean oil.

11. Composition according to claim 4 including also a polyvalent ion salt dissolved in the water phase in an amount up to about 1% by weight.

12. Composition according to claim 4 including also up to 0.5% by weight ascorbic acid.

13. Composition according to claim 12 including also up to about 1.0% by weight calcium ascorbate.

14. Composition according to claim 4 in which said composition has a pH of $6.5 \pm 1.0$.

15. Composition according to claim 1 including also propellant selected from the group consisting of normally gaseous materials liquifiable at pressures less than about 90 psig and selected from hydrocarbons containing from 3 to 5 carbon atoms inclusive, chlorine and/or fluorine substituted hydrocarbons containing from 1 to 6 carbon atoms inclusive, carbon dioxide, nitrogen, and nitrous oxide mixtures thereof.

16. Composition according to claim 15 in which the oil phase density is equal the aqueous phase density.

17. Cookware lubricant aerosol package comprising a pressure resistant container having a dispensing valve, and disposed therein:

|  |  | by Weight |
|---|---|---|
| A) | Lecithin |  |
|  | (1) P-inositol | 1.0 – 5.0 |
|  | (2) P-choline | 0.1 – 1.0 |
|  | (3) P-cephalin | 1.0 – 2.5 |
| B) | Mono and diglycerol oleates | 0.5 – 2.0 |
| C) | Soybean Oil | 1.0 – 10 |
| D) | Aliphatic organic liquid solvent | 0 – 10 |
| E) | Water | 15 – 75 |
| F) | Propellant | 10 – 50 | to 100 percent by weight.

18. Cookware lubricant aerosol package comprising a pressure resistant container having a dispensing valve, and disposed therein:

|  |  | % by Weight |
|---|---|---|
| A) | Lecithin phosphatides comprising at least 10% by weight P-inositol | 4 |
| B) | Soybean Oil | 3 |
| C) | Aliphatic Solvent | 7 |
| D) | Water | 50 |
| E) | Propellant |  |
|  | (1) Isobutane | 9 |
|  | (2) Difluorodichloromethane | 26 |
| F) | Glyceryl palmitate | 1 | to 100 percent.

19. Method of preparing a cookware surface lubricating composition comprising 2 to 10 percent by weight of lecithin containing at least 10 percent by weight P-inositol which includes gently swirling ambient or room temperature water previously warmed to between 130° F and 175° F into lecithin in the required amount.

20. Method according to claim 19 including also filling said composition while hot into a can and propellant pressurizing said hot composition.

21. Method of preparing a highly aqueous cookware surface lubricating composition comprising 2 to 10 percent by weight lecithin containing at least 10% by weight P-inositol which includes slowly adding preheated water in the required amount and at a temperature of about 165° F to a slowly turning mass at ambient or room temperature of lecithin.

22. Method according to claim 21 including also filling said composition while hot into a can and propellant pressurizing said hot composition.

* * * * *